Oct. 10, 1944.    J. M. BIOW    2,360,099
PHOTOGRAPHIC DISPLAY
Filed Aug. 27, 1941    2 Sheets-Sheet 1
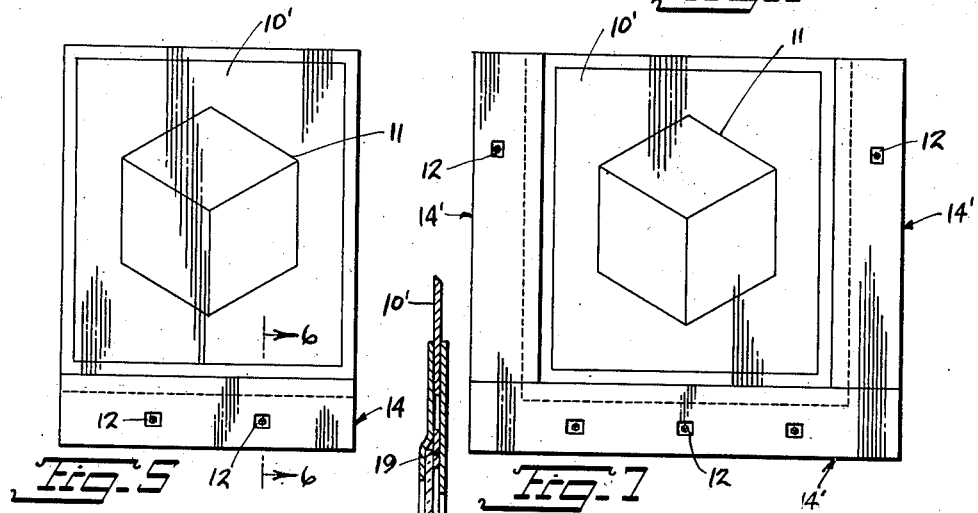

Oct. 10, 1944.  J. M. BIOW  2,360,099
PHOTOGRAPHIC DISPLAY
Filed Aug. 27, 1941  2 Sheets-Sheet 2
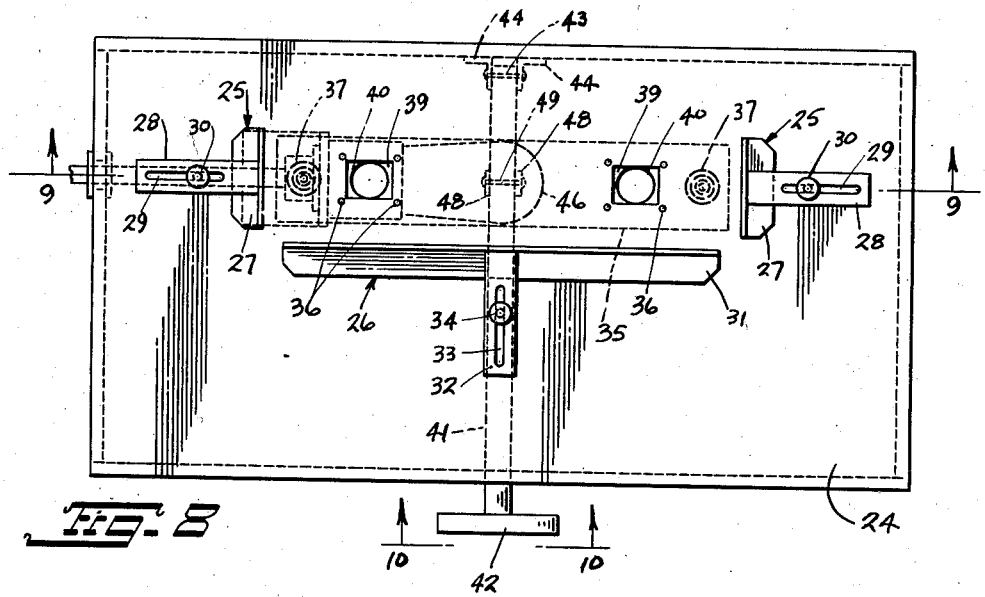
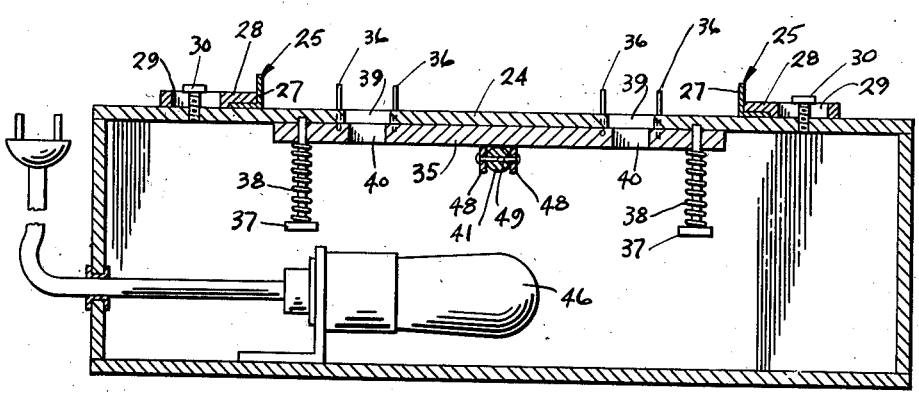
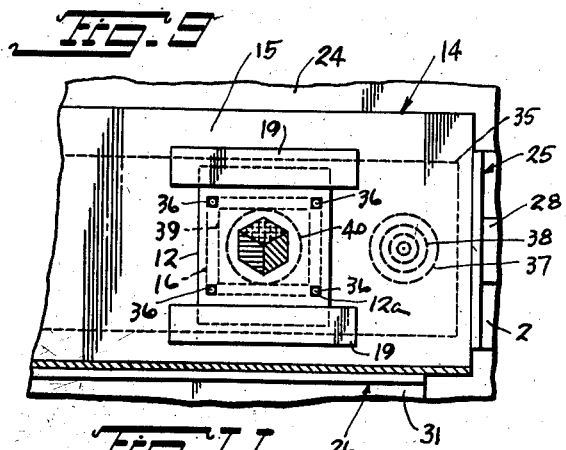
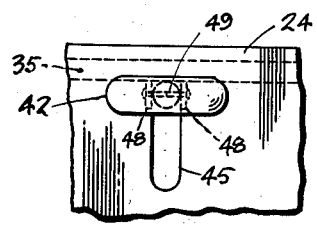
INVENTOR.
JESSE M. BIOW
BY
ATTORNEY.

Patented Oct. 10, 1944

2,360,099

UNITED STATES PATENT OFFICE 2,360,099

PHOTOGRAPHIC DISPLAY

Jesse M. Biow, New York, N. Y.

Application August 27, 1941, Serial No. 408,502

1 Claim. (Cl. 40—158)

This invention relates to new and useful improvements in photographic displays of any and all conceivable subjects, and methods for the manufacture thereof.

In recent years color photography has been developed to a point where colored photographs may be supplied, but at a cost very much greater than the conventional black and white photographs. However, processes have been developed for supplying small color transparencies at low cost.

This invention proposes a certain combination of the usual black and white photograph of a subject with one or more color transparencies of the identical subject mounted on the photograph in such a manner that an observer may look through the transparencies or may project the transparencies upon a screen. With this construction the black and white photograph may be examined for details other than color, and when the color scheme is desired it is merely necessary to inspect the transparencies. Commercial viewers or projectors may be used for the latter inspection.

The instant invention is particularly intended for a merchandise and display news service, though of course it may also be used for different purposes. Heretofore, black and white photographs have been supplied to subscribers interested in merchandise and displays. However these black and white photographs did not give a good idea of the color of the merchandise or of the displays. With the new invention the subscribers, at but a slight increase in the cost of the service, may have the color scheme as well as the usual photographic details.

In accordance with this invention the photographic information may comprise the usual black and white photograph and one or more color transparencies of the identical subject mounted thereon in a convenient way, which is also convenient for an examination and inspection of the transparencies.

In one form of the invention it is proposed that a pair of small color stereoscopic transparencies be mounted on each of the black and white photographs. In other forms of the invention one or more color transparencies may be mounted on the usual black and white photographs, which transparencies need not be stereoscopic.

In accordance with the present invention the exact location of the transparencies upon the black and white photograph is not important. However, it has been found that a satisfactory location would be upon an edge portion of the photograph.

In so far as the details of the invention are concerned it is proposed that the color transparency or transparencies be secured upon a mount of single or double layers of material which in turn is secured on the black and white photograph. This mount may be engaged over an edge portion or corner of the photograph and then the latter member formed with suitable openings so as not to obstruct a view of the transparencies. In another form it is proposed that the mount be secured to an edge portion of the photograph only, or may be mounted directly upon the photograph.

The invention also contemplates a novel method by which the transparency or transparencies may be secured on the mount in properly aligned positions with a minimum of effort. Specifically, it is proposed to use transparencies in motion picture strip formation and to properly support and hold these transparencies during the mounting thereof by pins engaging through the perforations of the motion picture strip.

An apparatus is also proposed for assisting in carrying out the method of manufacturing photographs with photographic information in accordance with this invention.

Another object of the invention is the construction of a device as described which is simple and durable and which may be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure—

Fig. 1 is an elevational view of a photographic display constructed in accordance with this invention.

Fig. 2 is a fragmentary enlarged detailed view of the lower right hand corner of Fig. 1.

Fig. 3 is a fragmentary enlarged vertical sectional view taken on the line 3—3 of Fig. 2.

Fig. 4 is a fragmentary sectional view taken on the line 4—4 of Fig. 3.

Fig. 5 is an elevational view of another photographic display constructed in accordance with another form of this invention.

Fig. 6 is a fragmentary enlarged sectional view taken on the line 6—6 of Fig. 5.

Fig. 7 is an elevational view of another photographic display embodying this invention.

Fig. 8 is a plan view of an apparatus used to carry out a method for manufacturing the photographic display.

Fig. 9 is a vertical sectional view taken on the line 9—9 of Fig. 8.

Fig. 10 is a fragmentary elevational view looking in the direction of the line 10—10 of Fig. 8.

Fig. 11 is a fragmentary enlarged plan view of a portion of Fig. 8 illustrated with a portion of a mount in position thereon, to better illustrate the method of manufacturing the photographic display.

The photographic display, in accordance with the form of the invention illustrated in Figs. 1 to 4 inclusive, includes a conventional black and white photograph 10 of a subject 11 and small color transparencies 12 of the identical subject mounted on the said photograph 10 in a way so that an observer may look through the transparencies, or the transparencies may be projected upon a screen. The subject 11, for purposes of illustration, comprises a cube, though it should be understood that the subject may be a window display, a countryside, merchandise, or any other subject desired. Figs. 2 and 4 disclose enlargements of the transparencies 12 and show that the subject 11 is in color, indicated by the color cross hatching thereof.

The transparencies 12 are mounted upon the photograph 10 by the use of a mount 14 which may be of any design and construction, but for purposes of illustration consists of a folded sheet having a rear layer 15 with a large window 16, and a front layer 17 with a slightly smaller window 18 superimposed on the window 16. Each transparency 12 is in the form of a motion picture strip transparency and is mounted on the inner face of the rear layer 15 by several strips of tape 19 or other fastening means. The motion picture strip transparency 12 has the usual four corner perforations 12a. These perforations are located within the four corners of the large window 16, but are normally hid from view by the edge portions of the small window 18 which extend over the perforations.

The perforations 12a are useful in properly mounting the transparencies 12 upon the mount 14. A method used will be given in greater detail as this specification proceeds. However, at this time it should be noted that it is a feature of the invention to have the window 18 smaller than the window 16 so that the perforations 12a are covered.

The black and white photograph 10 may be inspected for details, except color. In so far as color is concerned the lower right hand corner of the photograph, which is provided with the transparencies 12, may be engaged in a conventional viewer (not shown) and the color scheme of the subject 11 may be readily studied. Another way of using the photograph display would be to place the photograph in a projector (not shown) so that the transparency or transparencies are projected. In one form of the invention the transparencies 12 may be stereoscopic, though this is merely a matter of choice. The photograph 10 is formed with windows 20 aligned with the windows 16 and 18 so as not to obstruct the view of the transparencies 12. The folded sheet 14 of the mount may comprise a sheet of stiff paper or cardboard. It may be secured upon the photograph 11 with adhesive material.

In Figs. 5 and 6 a modified form of the invention has been disclosed which distinguishes from the prior form in the way in which the mount 14 with the transparencies 12 are secured upon the photograph. More specifically, a black and white photograph 10' of a subject 11 is shown provided with the mount 14 which supports the transparencies 12. However, the mount 14 is attached in a specific way upon the photograph 10'. It is attached along the bottom edge portion of the photograph. With this arrangement it is not necessary to perforate the photograph 10' to produce openings to align with the windows of the mount. In other respects this form of the invention is similar to the previous form and like parts are identified by like reference numerals.

In Fig. 7 another modified form of the invention is disclosed which distinguishes from the form shown in Figs. 5 and 6 merely in the fact that the photograph 10' is provided with a plurality of mounts 14' mounted along the edge portions thereof and these mounts 14' support a plurality of transparencies 12. The transparencies 12 may differ from each other merely in color scheme. In other words, the black and white photograph 10' may show a certain subject and the transparencies 12 show the same subject in different colors. In other respects this form of the invention is similar to the previous forms.

In Figs. 8 to 10 an apparatus has been disclosed by which it is possible to use a certain method for manufacturing the photographic display with dexterity. This apparatus includes a support 24 for receiving and holding the mount 14 for the transparency or transparencies. The support 24 is provided with several gauges 25 and 26 which may be adjusted to accommodate the mount 14 so that mounts 14 may be placed on the support 24 in selected positions. Each gauge 25 comprises merely an angle member 27 having a projecting arm 28 with a slot 29 through which a clamp screw 30 passes. This screw 30 is mounted on the support 24. The screw 30 may be loosened and then the gauge 25 adjusted. The gauge 26 also comprises an angle member 31 having an arm 32 with a slot 33 which is engaged by a clamp screw 34.

A member 35 is movably mounted beneath the support 24 and has one or more groups of projecting pins 36. There are four pins 36 in each group. These pins 36 are so spaced that they may engage through the perforations 12a of the motion picture strip color transparency 12 previously described. The pins 36 project upwards through apertures in the support 24. The member 35 is in the form of a strip. Fastening elements 37 are mounted upon the bottom of the support 24 and freely pass through the member 35. Springs 38 act between the heads of the fastening elements 37 and the member 35 for urging the member 35 against the bottom face of the support 24. The support 24 has windows 39 within the compass of each group of four pins 36. The member 35 has openings 40 aligned with the windows 39.

A rod 41 is mounted beneath the support 24 and has a projecting handle 42 by which it may be moved. The inner end of the rod 41 is pivotally mounted by a pintle 43 on brackets 44 mounted on the support 24. The front end of the rod 41 extends out of a slot 45 in the front portion of the support 24. The support 24 is in the nature of a box. A lamp 46 is mounted within this box by which the interior may be illuminated so that transparencies 12 which are placed over the windows 39 may be readily inspected.

Lugs 48 project from the bottom of the member 35, and a pintle 49 engages through these lugs and through the rod 41. The arrangement is such that when the handle 42 is moved downwards the member 35 will be correspondingly moved and the pins 36 will be moved downwards to a point at which their tips are flush with or slightly below the top surface of the support 24. The openings in the support 24 through which the pins 36 pass are large enough to permit the pins to move, even though they move on a slight arc due to the pivotal mounting of the rod 41. Or, there may be sufficient play between the pintle 49 and the lugs 48 to permit the downward and upward motion of the pins 36, as desired.

The method for making the photograph display, in accordance with this invention, is as follows: The mount 14 is placed on the support 24 between the guides 25 and 26. This insures the mount 14 being correctly positioned with respect to the pins 36 and the windows 39. It will be found that the pins 36 are projecting up through the corners of the windows 16 of the mount. The transparencies 12 are then placed across the windows 39 so that the pins 36 project up through the perforations 12a thereof. Then the transparencies 12 are attached to the layer 15 of the mount 14 by the application of tape 19 or other fastening means. The handle 42 is then depressed until the rod 41 strikes the bottom of the slot 45, and this causes the pins 36 to be retracted from the perforations 12a. The mount 14 is now free and may be removed and is ready to be applied to a black and white photograph in accordance with this invention.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A photographic article, comprising a black and white opaque photograph of a subject, an aperture in said photograph, a smaller color transparency of the identical subject mounted on said photograph and in alignment with said aperture, whereby a viewer may look through said color transparency and see the same subject in color.

JESSE M. BIOW.